J. W. JEPSON.
ELECTRICAL SYSTEM OF DISTRIBUTION.
APPLICATION FILED AUG. 24, 1915.
1,268,469.                                            Patented June 4, 1918.
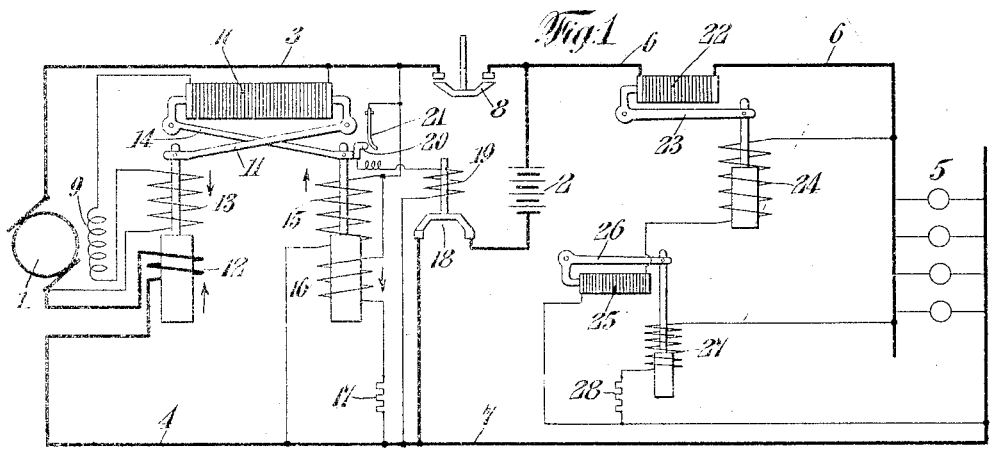
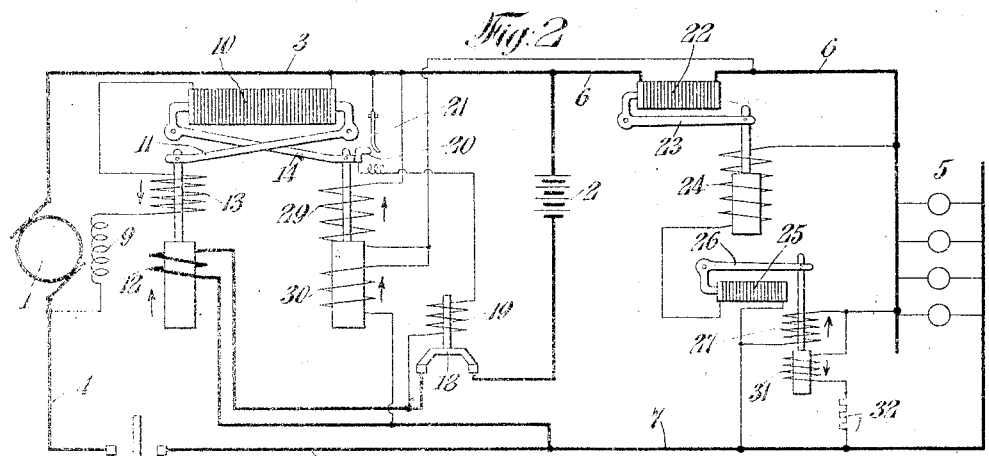
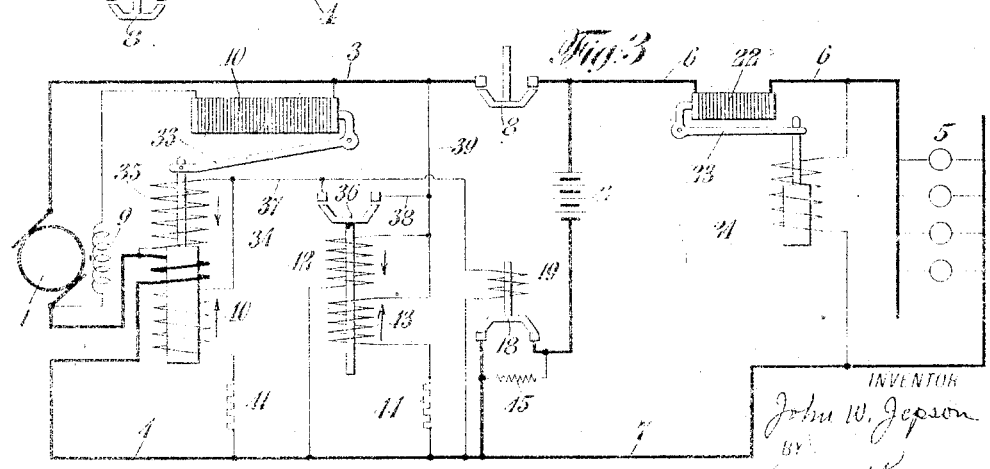
INVENTOR
John W. Jepson
BY
Kenyon & Kenyon
ATTORNEYS

UNITED STATES PATENT OFFICE.

JOHN W. JEPSON, OF BUFFALO, NEW YORK, ASSIGNOR TO GOULD COUPLER COMPANY, A CORPORATION OF NEW YORK.

ELECTRICAL SYSTEM OF DISTRIBUTION.

1,268,469.

Specification of Letters Patent.

Patented June 4, 1918.

Application filed August 24, 1915. Serial No. 47,030.

*To all whom it may concern:*

Be it known that I, JOHN W. JEPSON, a citizen of the United States, and a resident of Buffalo, county of Erie, State of New York, have invented certain new and useful Improvements in Electrical Systems of Distribution, of which the following is a specification.

My invention relates to improvements in electrical systems of distribution and more particularly to systems employing a generator feeding a storage battery and work circuit, the battery being charged by the generator and acting to supply the work circuit when the generator is stopped or running at too low a speed. Systems of this general character are commonly employed in the lighting of railway cars. In such systems it has been proposed to regulate the generator driven at variable speed, responsive to current changes to limit the current thereof, and also responsive to voltage changes to limit the voltage thereof. It has also been proposed to limit or regulate the voltage of the generator to cut down or taper off the battery charging current when the battery has become substantially charged. In such arrangements however, while the voltage may be so regulated as to reduce the charging current to a few amperes, it has been practically impossible to entirely discontinue the charging current or reduce it to so small a value but that it will have a deleterious action on the fully charged battery. According to my invention, when the battery has become substantially charged, the battery circuit is practically opened so that the charging current is entirely eliminated or reduced to so small a value that it will have no bad effect on the battery, and at the same time the generator voltage is regulated so that the generator may still continue to feed the work circuit if so desired, and when the generator stops or is running at too low a speed the battery circuit is automatically practically connected with the work circuit so that the battery will feed the work circuit.

Further objects, features and advantages will more clearly appear from the detailed description given below, taken in connection with the accompanying sheet of drawings which form a part of this specification.

In the drawings Figure 1 is a diagram illustrating a system embodying my improvements in one form, and Figs. 2 and 3 are diagrams illustrating modified systems.

Referring to Fig. 1, 1 represents a generator driven at variable speed, and 2, a storage battery fed thereby through the mains 3 and 4. 5 represents a lamp or work circuit connected to the battery and generator to be fed thereby, through the mains 6 and 7. 8 represents an automatic switch of any suitable kind adapted to connect the generator to the battery and work circuit when the voltage of the generator is sufficient and adapted to disconnect the battery and work circuit from the generator when its voltage is insufficient as when it is running at too low a speed or is stopped. 9 represents the shunt field windings of the generator, having, in series therewith, a carbon pile rheostat 10 operated upon on one end by a lever 11 controlled by a solenoid having two windings, one a coil 12 serially connected between the generator and battery and responsive to variations in the total current supplied by the generator and the other, a coil 13 serially connected in the generator field circuit. Operating upon the other end of the pile 10 is a lever 14, controlled by a solenoid having two windings, one a coil 15 connected across the generator to be responsive to voltage variations thereof, and the other a coil 16 likewise connected across the generator and having in series therewith a resistance 17 so selected or situated that it is not materially affected by temperature changes in the coils 15 and 16. The coil 16 opposes the coil 15, but is of less magnetic strength. The coil 16 and resistance 17 are added to compensate for the effect of temperature variations on the controlling coil 15, so that the coil 15 will always act to raise the lever 14 and increase the resistance in the generator field circuit at a predetermined generator voltage irrespective of changes in temperature of the coil 15. This feature is more fully described in my copending application Ser. No. 35,991, filed June 24, 1915, and therefore need not be more fully discussed here.

18 represents a switch in series with the battery. This switch is controlled by a coil 19 connected across the generator and having in series therewith switch contacts 20 and 21. The contact 20 is carried on the lever 14, so that when the lever 14 is raised by its solenoid, contact 20 contacts with and wipes along contact 21, thus closing the circuit of coil 19 and causing the switch 18 to open the battery circuit.

In operation, when the generator attains a speed and voltage sufficient to supply the work circuit or battery or both, the automatic switch 8 closes. When the current supplied by the generator attains a predetermined value, the strength of coil 12 becomes sufficient to raise the lever 11 and thus, increase the resistance in the generator field circuit and so regulate the generator voltage that the coil 12 tends to maintain the generator current substantially constant. As the speed of the generator increases however, thus causing the generator field current to be weakened, the opposing coil 13 is correspondingly weakened so that less current is required in the coil 12, to raise the lever 11. Accordingly the presence of the opposing coil 13 results in more or less decreasing the generator current with an increase in speed, so that at the higher speeds the current will be decreased, and so will not be likely to cause commutation trouble as by sparking at the brushes of the generator. Therefore, the current is varied with speed changes, during the charging of the battery.

When the battery has become substantially charged as indicated by a predetermined rise in voltage across the generator and battery, the solenoid comprising coil 15, becomes strong enough to raise the lever 14 and cause it to operate the pile 10. The first movement of the lever 14, causes contact 20 to engage contact 21 and so energize coil 19 and cause the switch 19 to open the battery circuit so that no further current can go to the battery. The charging of the battery is therefore immediately stopped and no current can pass through it which might be harmful to it. This action so weakens coil 12 that it is no longer able to lift the lever 11 and the regulation of the generator proceeds solely by means of the solenoid of coil 15, which acts to regulate the generator to maintain its voltage substantially constant throughout speed changes. The switch 18 being in the battery branch or battery circuit, as it is called, its opening does not prevent the generator from continuing to supply the work circuit.

In order that the variations in generator voltage during the charging of the battery, may not fall upon the work circuit, a carbon pile rheostat 22, is provided between the battery and work circuit. The pile 22 is controlled by a lever 23, operated by a solenoid 24, connected across the work circuit and having in series therewith a small carbon pile resistance, 25, operated upon by a lever 26, controlled by a solenoid 27, connected across the work circuit to be responsive to voltage variations thereacross, and having in series therewith, a resistance 28. Should the voltage across the work circuit tend to increase, coil 27 decreases the resistance of pile 25 and this increases the strength of coil 24 so that it increases the resistance of pile 22 so as to keep down the voltage applied to the work circuit and maintain it substantially constant. A tendency for the voltage across the work circuit to decrease results in the reverse operation.

When the generator slows down or stops, the generator voltage is decreased, thus weakening the solenoid of coil 15, causing lever 14 to descend and contacts 20 and 21 to separate so that coil 19 is deënergized and switch 18 closes. This permits the battery to supply current to the work circuit. When the generator voltage drops below the discharge voltage of the battery, the automatic switch 8 opens to disconnect the generator in a well known manner.

In the arrangement of Fig. 2 the parts are the same except that the coil 12 is connected in the battery branch so as to be responsive only to the battery current, and, instead of providing the voltage solenoid with coils 15 and 16 across the generator, a solenoid operates the lever 14 composed of two coils, one a coil connected across the work circuit regulator 22 to be responsive to changes in the voltage drop therein, and the other, a coil 30 connected across the work circuit to be responsive to variations in voltage thereacross. When the battery becomes charged as indicated by a predetermined voltage drop in the rheostat 22, the lever 14 is raised and regulates the generator and causes the battery to be disconnected as before. Also in Fig. 2 an additional winding 31, having in series therewith a resistance 32, is provided on the solenoid operating the lever 26 in order to compensate for temperature changes in the controlling coil 27 in the same manner that the coil 16 and resistance 17 compensate for temperature changes in the coil 15 of Fig. 1.

In Fig. 3, coil 13 is omitted and the carbon pile generator regulator 10 is operated by a lever 33 controlled by a solenoid having three windings, one a coil 34, serially connected between the generator and battery and responsive to changes in the current supplied by the generator; another, a coil 35 which when the switch 36 is closed, is connected across the generator through the wires 37, 38 and 39 to be responsive to voltage changes across the generator and battery; and the third, a coil 40 similarly connected across the generator but having in series therewith a resistance 41. The coil 40 and resistance 41 are added to compensate for the effect of temperature changes on the controlling voltage coil 35 and act in the same manner as the coil 16 and resistance 17 act with respect to the coil 15.

The switch 36 is closed by means of a solenoid having a controlling voltage coil 42, connected across the generator to be responsive to variations in voltage across the generator and battery. The solenoid also has a coil 43 with a resistance 44, in series therewith for compensating for the effect of temperature variations on the coil 42 in the manner heretofore pointed out.

While the generator is charging the battery the coils 19, 35 and 40 are deënergized the switch 36 being open. The coil 34 therefore acts to maintain a substantially constant generator current throughout changes in speed. When the battery becomes substantially charged, indicated by a predetermined rise in voltage across the generator and battery, the solenoid comprising coil 42 closes the switch 36. This connects coil 19 across the generator so that it opens the switch 18, thus substantially opening the battery circuit and immediately stopping the charging of the battery and weakening coil 34. The closing of switch 36, also connects coils 35 and 40 across the generator so that they now act to regulate the action of the pile 10 to limit the voltage of the generator while it continues to supply the work circuit. When the generator slows down or stops the solenoid comprising coil 42 is weakened causing switch 36 to open and switch 18 to close, thus permitting the battery to feed the work circuit as in Fig. 1. If desired, a resistance 45 may be connected about the switches 18 as shown in Fig. 3. This resistance is so great however, that it will not permit any harmful current to flow to the battery when the switch 18 is open.

Although I have described my improvements in great detail and in connection with certain specific systems I do not desire to be limited to details or such use, as many changes and modifications may be made without departing from the spirit and scope of my invention as outlined in the appended claims.

What I claim as new and desire to secure by Letters Patent, is:

1. In an electrical system of distribution the combination of a generator, a storage battery and work circuit fed thereby, means for regulating the generator voltage and means for substantially disconnecting the battery from the generator, when the battery has become substantially charged, whereby with the generator feeding the work circuit, the charging current will be substantially eliminated, said last mentioned means acting to connect the battery, to feed the work circuit, when the generator stops.

2. In an electrical system of distribution the combination of a generator, a storage battery and work circuit fed thereby and means for substantially disconnecting the battery from the generator when the battery has become substantially charged whereby with the generator feeding the work circuit, the charging current will be substantially eliminated, said means acting to connect the battery to feed the work circuit when the generator stops.

3. In an electrical system of distribution the combination of a generator driven at variable speed, a storage battery and work circuit fed thereby, means for regulating the voltage of the generator for speed changes thereof, a switch serially connected between the generator and battery and means acting to open said switch upon the battery becoming substantially charged and closing said switch when the generator voltage is insufficient to supply the work circuit.

4. In an electrical system of distribution the combination of a generator driven at variable speed, a storage battery and work circuit fed thereby in parallel circuits, an automatic switch for connecting the generator to the battery and work circuit when its voltage is sufficient and to disconnect the generator therefrom, when its voltage is insufficient, means for regulating the generator voltage for changes in speed, a switch in the battery circuit, and means opening said switch when the battery becomes substantially charged to stop the charging of the battery and acting to cause the battery circuit to be connected with the work circuit, while said first mentioned switch disconnects the generator from the battery and work circuit, whereby the work circuit is supplied from the battery.

5. In an electrical system of distribution the combination of a generator driven at variable speed, a storage battery and work circuit fed thereby in parallel circuits, an automatic switch for connecting the generator to the battery and work circuit when its voltage is sufficient and to disconnect the generator therefrom, when its voltage is insufficient, a switch in the battery circuit, and means opening said switch when the battery becomes substantially charged to stop the charging of the battery, while permitting the work circuit to be fed by the generator, said means acting to cause the battery circuit to be connected with the work circuit while said first mentioned switch disconnects the generator from the battery and work circuit, whereby the work circuit is supplied from the battery.

6. In an electrical system of distribution the combination of a generator driven at variable speed, a storage battery and work circuit supplied thereby, a coil serially connected between the generator and battery regulating the voltage of the generator, a switch serially connected with the battery, a coil acting to cause said switch to open when the battery becomes substantially charged to stop the charging of the battery and means whereby the generator voltage is regulated, responsive to generator voltage changes, after said switch is opened; said switch being automatically closed when the generator voltage is insufficient to supply the work circuit.

7. In an electrical system of distribution, the combination of a generator, current controlled means for regulating the generator voltage, voltage controlled means for regulating the generator voltage adapted to operate when there is a given voltage of the system, a switch in the battery circuit, a voltage coil controlling said switch to open the switch when the battery is charged, and a switch controlling the circuit of said last named voltage coil and operated by said voltage controlled means.

In testimony whereof, I have signed my name to this specification.

JOHN W. JEPSON.